US009474018B2

United States Patent
Akhtar et al.

(10) Patent No.: US 9,474,018 B2
(45) Date of Patent: Oct. 18, 2016

(54) SMART RADIO AREA NETWORK FOR WIRELESS DISTRIBUTED CLOUD COMPUTING

(75) Inventors: Haseeb Akhtar, Garland, TX (US); Gunnar Mildh, Sollentuna (SE); Mattias Rimbark, Huddiinge (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 73 days.

(21) Appl. No.: 13/571,847

(22) Filed: Aug. 10, 2012

(65) Prior Publication Data

US 2013/0044705 A1    Feb. 21, 2013

Related U.S. Application Data

(60) Provisional application No. 61/557,247, filed on Nov. 8, 2011, provisional application No. 61/523,983, filed on Aug. 16, 2011.

(51) Int. Cl.
| | |
|---|---|
| H04W 4/00 | (2009.01) |
| H04W 48/18 | (2009.01) |
| H04L 12/923 | (2013.01) |
| H04L 12/54 | (2013.01) |
| H04W 12/02 | (2009.01) |
| H04W 88/12 | (2009.01) |
| H04L 29/06 | (2006.01) |
| H04L 12/927 | (2013.01) |
| H04L 12/911 | (2013.01) |

(52) U.S. Cl.
CPC .......... *H04W 48/18* (2013.01); *H04L 12/5692* (2013.01); *H04L 47/762* (2013.01); *H04L 47/803* (2013.01); *H04L 47/808* (2013.01); *H04L 47/822* (2013.01); *H04L 47/824* (2013.01); *H04L 63/0227* (2013.01); *H04W 12/02* (2013.01); *H04W 88/12* (2013.01)

(58) Field of Classification Search
CPC ........................... H04L 47/762; H04W 48/18
USPC ........................................................ 370/329
See application file for complete search history.

(56) References Cited

U.S. PATENT DOCUMENTS

| | | | | |
|---|---|---|---|---|
| 8,483,057 | B2 * | 7/2013 | Cuervo | 370/230 |
| 8,787,380 | B2 * | 7/2014 | Taleb et al. | 370/392 |
| 8,848,608 | B1 * | 9/2014 | Addepalli et al. | 370/328 |
| 2010/0124223 | A1 * | 5/2010 | Gibbs et al. | 370/389 |
| 2010/0128708 | A1 * | 5/2010 | Liu et al. | 370/338 |
| 2010/0197266 | A1 * | 8/2010 | Raleigh | 455/406 |
| 2010/0272115 | A1 * | 10/2010 | Ramankutty | 370/401 |
| 2010/0299419 | A1 * | 11/2010 | Ramankutty et al. | 709/221 |
| 2011/0075675 | A1 * | 3/2011 | Koodli et al. | 370/401 |
| 2011/0096750 | A1 * | 4/2011 | Velandy et al. | 370/331 |
| 2011/0151924 | A1 * | 6/2011 | Miller | H04W 48/18 455/522.1 |
| 2011/0171915 | A1 * | 7/2011 | Gomes et al. | 455/73 |

(Continued)

*Primary Examiner* — Guang Li (57) ABSTRACT

A smart RAN for wireless distributed cloud computing with a UE, the RAN in communication with a Wi-Fi network, an LTE network and a 3G network. The RAN includes a network interface unit that communicates with the Wi-Fi, LTE in 3G networks. The RAN includes a processing unit which chooses which of the Wi-Fi, LTE and 3G networks to use to send and receive data at a given time based on loading condition of each radio access network technology, user's application/service requirements and user's policy. A method for sending and receiving data of a smart RAN for wireless distributed cloud computing with an UE and the RAN that is simultaneously in communication with a Wi-Fi network, an LTE network and a 3G network.

21 Claims, 8 Drawing Sheets

(56) References Cited

U.S. PATENT DOCUMENTS

| | | | |
|---|---|---|---|
| 2011/0305138 A1* | 12/2011 | Huomo | H04L 47/10 370/230 |
| 2011/0320323 A1* | 12/2011 | Cuervo | 705/30 |
| 2012/0039304 A1* | 2/2012 | Kim et al. | 370/332 |
| 2012/0063464 A1* | 3/2012 | Mehta | 370/401 |
| 2012/0087319 A1* | 4/2012 | Raleigh et al. | 370/329 |
| 2012/0166618 A1* | 6/2012 | Dahod et al. | 709/224 |
| 2012/0302244 A1* | 11/2012 | Sridhar et al. | 455/438 |
| 2013/0003699 A1* | 1/2013 | Liu et al. | 370/331 |
| 2015/0319686 A1* | 11/2015 | Hedberg | H04W 48/20 370/329 |

\* cited by examiner

SMART RADIO AREA NETWORK FOR WIRELESS DISTRIBUTED CLOUD COMPUTING

CROSS-REFERENCE TO RELATED APPLICATIONS

This application claims priority from U.S. provisional patent application 61/557,247 filed Nov. 8, 2011 and U.S. provisional patent application 61/523,983 filed Aug. 16, 2011, both of which are incorporated by reference herein.

TECHNICAL FIELD

The present invention is related to a smart (Radio Access Network) RAN for wireless distributed cloud computing with a User Equipment (UE), the RAN in communication with a Wi-Fi network, an LTE network and a 3G network. (As used herein, references to the "present invention" or "invention" relate to exemplary embodiments and not necessarily to every embodiment encompassed by the appended claims.) More specifically, the present invention is related to a smart RAN for wireless distributed cloud computing with a UE, the RAN in communication with a Wi-Fi network, an LTE network and a 3G network, where which of the Wi-Fi, LTE and 3G networks are chosen to use to send and receive data at a given time is based on loading condition of each radio access network technology, user's application/service requirements and user's policy.

BACKGROUND

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Cloud computing is becoming the de facto standard for providing both consumer and enterprise services over the Internet. Amazon, Google, Apple, AT&T etc. are some of the big names in the industry who are heavily invested in the cloud computing technology.

Although the wireless industry has not ventured into the space of cloud computing yet, there is a significant drive and opportunity for them to introduce this promising technology to the RAN. The current cloud solution architecture, however, is very centralized and the hardware/software components to support the cloud functions are typically located in the data centers. Since RF (Radio Frequency) resources are scarcer in nature than that of wired resources, one of the key challenges for the wireless industry will be to introduce the concept of distributed cloud in order make cloud computing in the RAN a viable technology.

There is no cloud based RAN that exists today in the industry. The following reasons try to explain the probable cause for this phenomenon:

- There is a distinct separation between RAN components and CN (Core Network) components. Cloud computing will require a limited merger of these two components.
- The concept of cloud computing is relatively new and has yet to be introduced into the RAN.
- The jury is still out on the question if introducing non-radio functionality into the RAN will impact the current processing/storage capacity and thereby degrade the existing services.

BRIEF SUMMARY OF THE INVENTION

The present invention pertains to a smart RAN for wireless distributed cloud computing with a UE, the RAN in communication with a Wi-Fi network, an LTE network and a 3G network. The RAN comprises a network interface unit that communicates with the Wi-Fi, LTE in 3G networks. The RAN comprises a processing unit which chooses which of the Wi-Fi, LTE and 3G networks to use to send and receive data at a given time based on loading condition of each radio access network technology, user's application/service requirements and user's policy.

The present invention pertains to a method for sending and receiving data of a smart RAN for wireless distributed cloud computing with a UE, the RAN in communication with a Wi-Fi network, an LTE network and a 3G network. The method comprises the steps of communicating with the Wi-Fi, LTE in 3G networks through a network interface unit of the RAN. There is the step of choosing with a processing unit of the RAN which of the Wi-Fi, LTE and 3G networks to use to send and receive data at a given time based on loading condition of each radio access network technology, user's application/service requirements and user's policy.

BRIEF DESCRIPTION OF THE DRAWING

In the accompanying drawings, the preferred embodiment of the invention and preferred methods of practicing the invention are illustrated in which.

DETAILED DESCRIPTION

Figure 8:
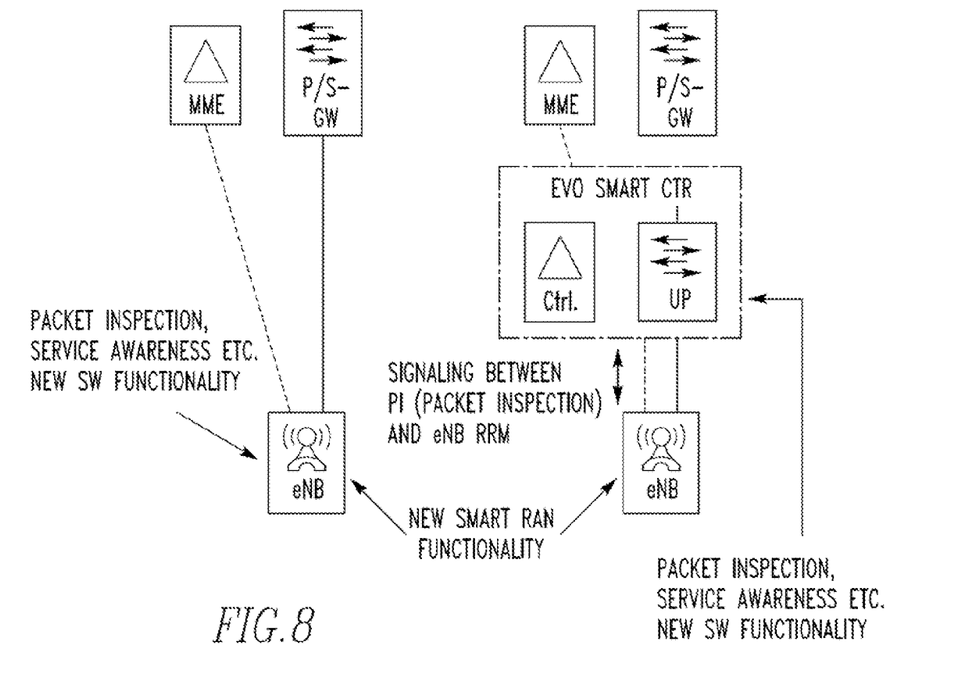
FIG. 8 shows two options for smart RAN in LTE.

Referring now to the drawings wherein like reference numerals refer to similar or identical parts throughout the several views, and more specifically to FIG. 8 thereof, there is shown a smart RAN 10 for wireless distributed cloud computing with a UE 12, the RAN 10 in communication with a Wi-Fi network, an LTE network and a 3G network. The RAN 10 comprises a network interface 14 unit that communicates with the Wi-Fi, LTE in 3G networks. The RAN 10 comprises a processing unit 16 which chooses which of the Wi-Fi, LTE and 3G networks to use to send and receive data at a given time based on loading condition of each radio access network technology, user's application/service requirements and user's policy.

The data may be sent and received as packets and the processing unit 16 performs packet inspection and enforces filtering/quality of service in regard to the packets. The processing unit 16 may perform Serving Gateway (SGW) function, PDN Gateway (PGW) function and Broadband Network Gateway (BNG) function. The processing unit 16 may perform AD (Advertisement) insertion, multiservice proxy, firewall and security and SIPTO/LIPA functions.

The processing unit 16 may perform multiservice proxy to identify services and then map these services down on different QoS bearers based on policies. The processing unit 16 may perform setup or modification of radio bearers is triggered via PCRF, Web Services AS (Application Server), API Gateway or any other Application Function (AF) servers. The processing unit 16 may establish QoS granularity by performing packet inspection with either SPI (Stateful Packet Inspection) or DPI (Deep Packet Inspection).

The processing unit 16 may provide feedback to a video coder through the network interface 14 for the video coder to adapt the video coder's service rate to accommodate the radio/transport loading condition at any given instance. The processing unit 16 may cause the AD Insertion function to interact with an operator's Mobile Marketing and Advertising components to receive an advertisement impression that needs to be sent to the UE 12. The processing unit 16 may cause the DPI function to inform the AD Selection and Campaign Management function about specific user behaviors in order to assist an operator to develop target advertisements for the UE 12.

The present invention pertains to a method for sending and receiving data of a smart RAN 10 for wireless distributed cloud computing with a UE 12, the RAN 10 in communication with a Wi-Fi network, an LTE network and a 3G network. The method comprises the steps of communicating with the Wi-Fi, LTE in 3G networks through a network interface 14 unit of the RAN 10. There is the step of choosing with a processing unit 16 of the RAN 10 which of the Wi-Fi, LTE and 3G networks to use to send and receive data at a given time based on loading condition of each radio access network technology, user's application/service requirements and user's policy.

The data may be sent and received as packets and there may be the step of the processing unit 16 performing packet inspection and enforces filtering/quality of service in regard to the packets. There may be the step of the processing unit 16 performs Serving Gateway (SGW) function, PDN Gateway (PGW) function and Broadband Network Gateway (BNG) function. There may be the step of the processing unit 16 performing AD insertion, multiservice proxy, firewall and security and SIPTO/LIPA functions.

There may be the step of the processing unit 16 performing multiservice proxy to identify services and then map these services down on different QoS bearers based on the Operator's policies. There may be the step of the processing unit 16 performing setup or modification of radio bearers is triggered via PCRF, Web Services AS (Application Server), API Gateway or any other Application Function (AF) servers. There may be the step of the processing unit 16 establishing QoS granularity by performing packet inspection with either SPI (Stateful Packet Inspection) or DPI (Deep Packet Inspection).

There may be the step of the processing unit 16 providing feedback to a video coder through the network interface 14 for the video coder to adapt the video coder's service rate to accommodate the radio/transport loading condition at any given instance. There may be the step of the processing unit 16 causing the AD insertion function to interact with an operator's Mobile Marketing and Advertising components to receive an advertisement impression that needs to be sent to the LTE 12. There may be the step of the processing unit 16 causing the DPI function to inform the AD Selection and Campaign Management function about specific user behaviors in order to assist an operator to develop target advertisements for the UE 12.

In the operation of the invention, the following new functions are introduced into the RAN 10 and thereby bring applications/services closer to the users.
Distributed Caching/CDN
Local breakout (e.g. for fixed/cellular corporate traffic)
Additional Internet peering points
Distributed Cloud services
PDN Gateway
GGSN
RAN/Service layers synergies
  QoS prioritization
  Radio/Transport Network Feedback
  Service aware RRM (Radio Resource Management)
  Etc.

Moving the functions (listed above) into the RAN 10 makes it possible to provide significantly better user experience.

Figure 1:
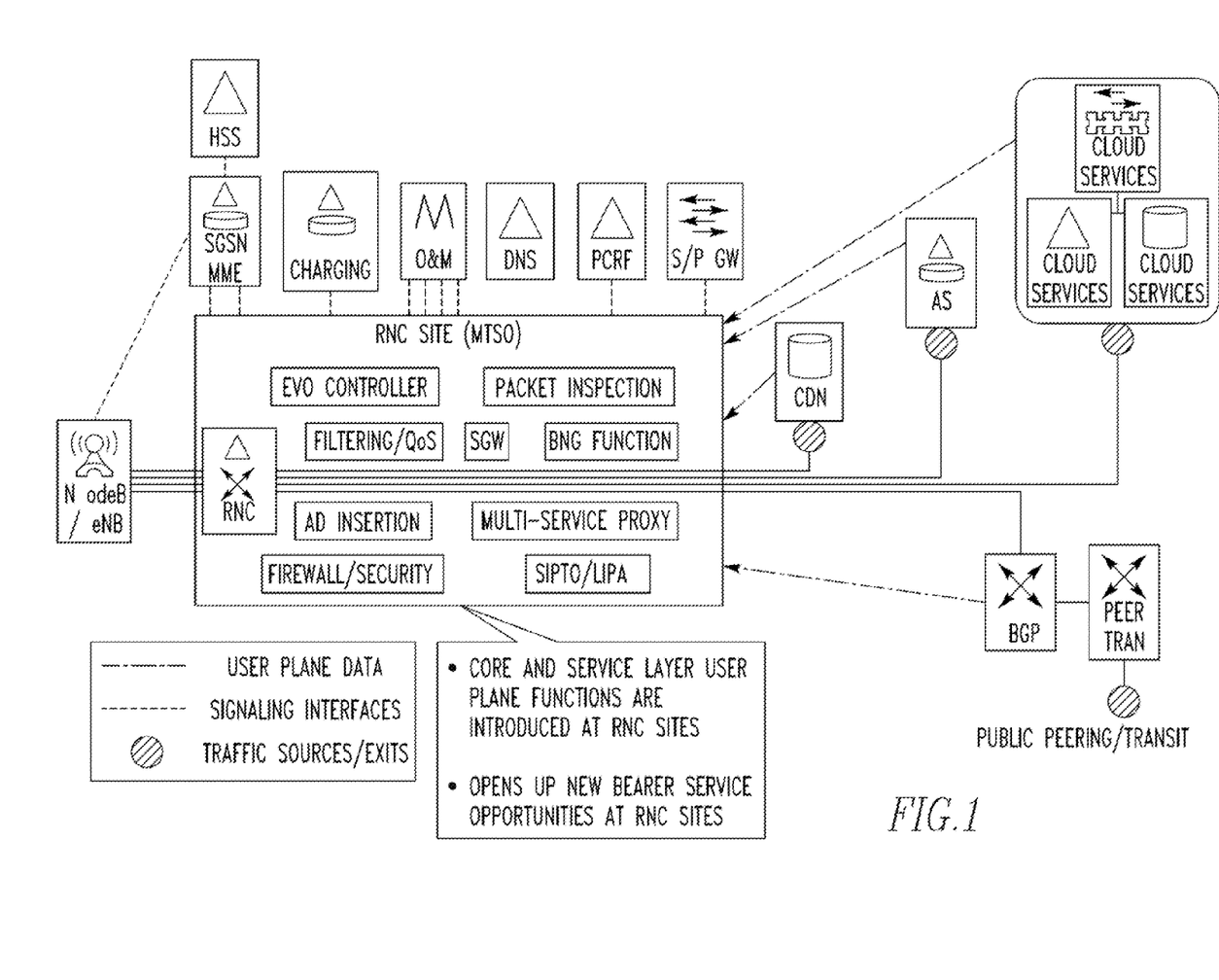
FIG. 1 shows the transfer of user plane functions in smart RAN.

As shown in FIG. 1, the following user plane functions have been introduced in the RNC-site in order to support a cloud RAN 10 solution.
1. Packet Inspections
2. Filtering/QoS
3. SGW (Serving Gate Way) function
4. BNG (Broadband Network Gateway) function
5. AD insertion
6. Multi-Service Proxy
7. Firewall/Security
8. SIPTO/LIPA The cloud functionality (Cloudlet) shown in FIG. 1 can be implemented either on EVO Controller (the next generation of Ericsson Blade Server platform) boards or on stand-alone nodes. This architecture provides a flexible and modular approach towards implementing the Cloudlet. This also combines packet inspection and radio layer specific user plane functions.

Figure 2:
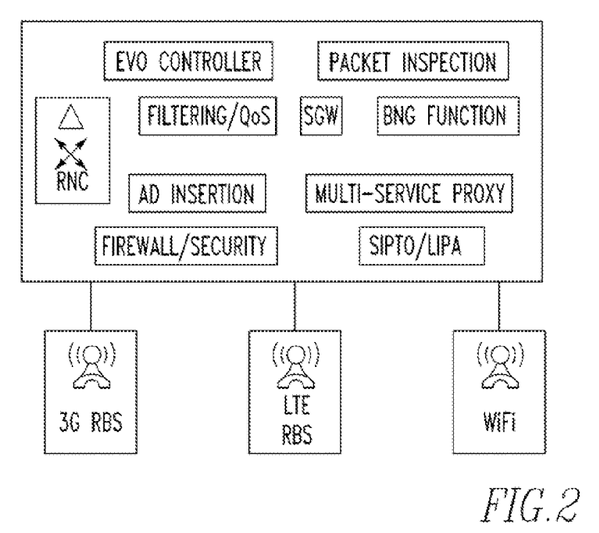
FIG. 2 shows multi-RAT aspects of smart RAN.

Additionally, the following benefits are achieved by implementing the Cloudlet at the RNC and/or MTSO (Mobile Telephony Switching Office) sites.
Low latency
Minimum processing
  Avoids packet processing at multiple nodes
  No inter-site (i.e., between RAN 10 and CN) transport
Better security
  User plane traverses less number of nodes and external interfaces
Simpler maintenance FIG. 2 illustrates the common anchor point for both 3GPP (GSM, WCDMA, LTE) and fixed (public Wi-Fi, corporate LAN) access technologies inside the Cloudlet. This allows the end user to access the same services regardless of access technology.

Figure 3:
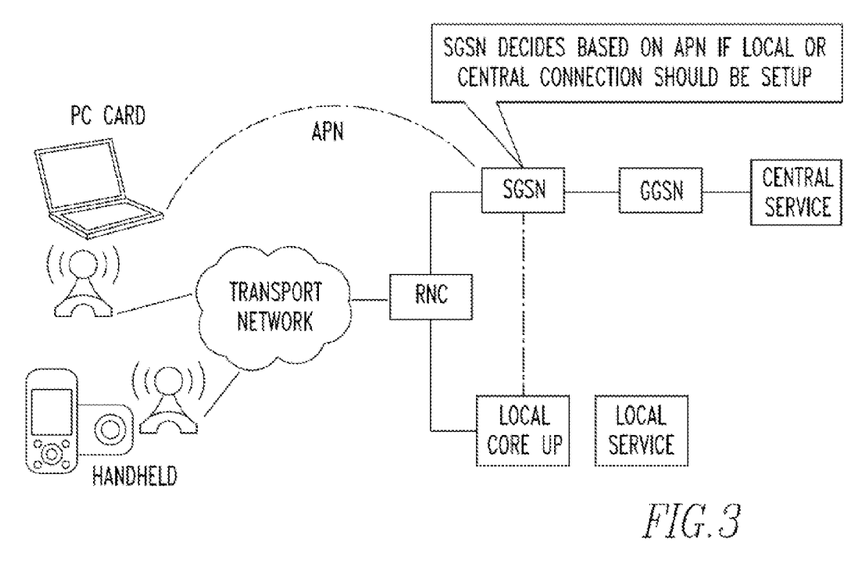
FIG. 3 shows a multi-APN implementation of Distributed Cloud in RAN.

FIG. 3 is an implementation of multi-APN based services for the cloud RAN 10. As shown in FIG. 3, both local and non-local parallel services which are terminated at a central site can be supported by either using multiple APN (multiple PDP contexts) or by using single APN with smart service routing.

Figure 4:
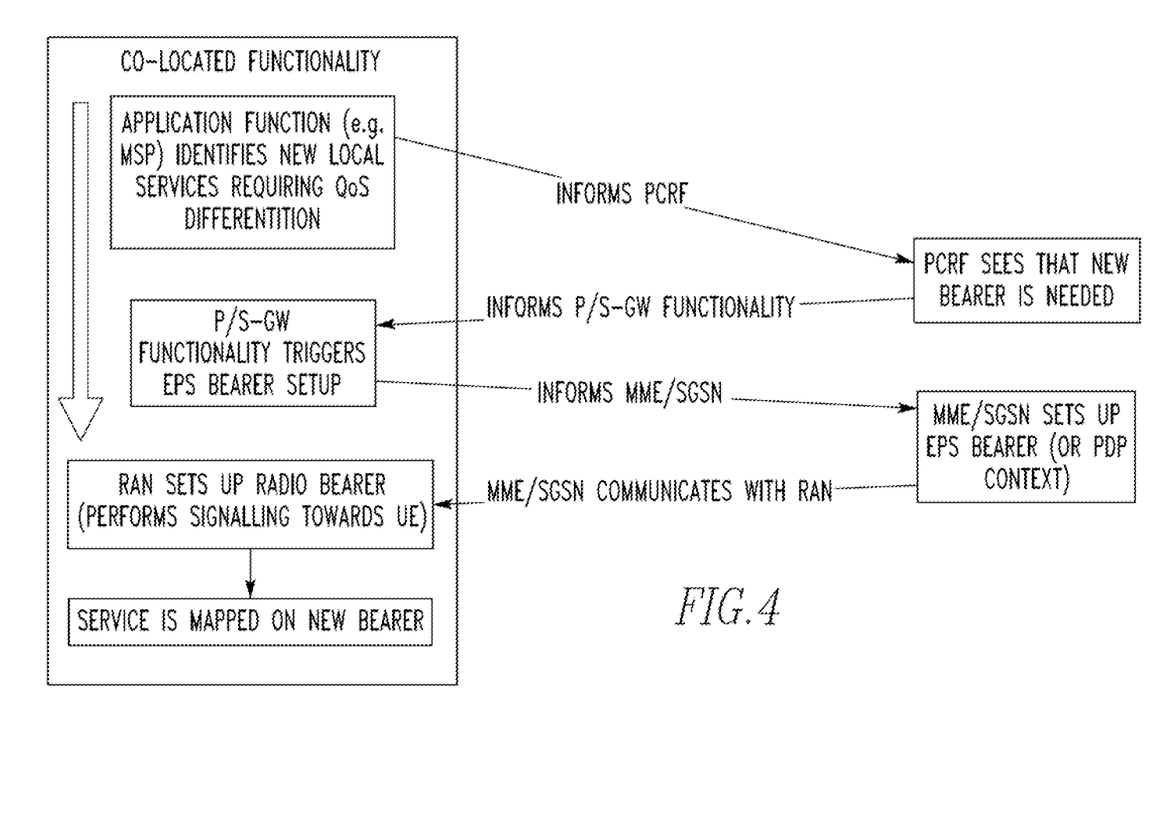
FIG. 4 shows QoS prioritization in smart RAN.

FIG. 4 depicts how existing 3GPP based BBF (Bearer Binding Function) defined QoS differentiation mechanism can be used in the smart RAN 10. The newly introduced service functionality (e.g. Multi-Service Proxy) of the smart RAN 10 can identify services and then map these services down on different QoS bearers based on policies. As shown in FIG. 4, setup/modification of radio bearers when the UE 12 is in 3GPP access can also be triggered via PCRF, MME or SGSN.

Figure 5:
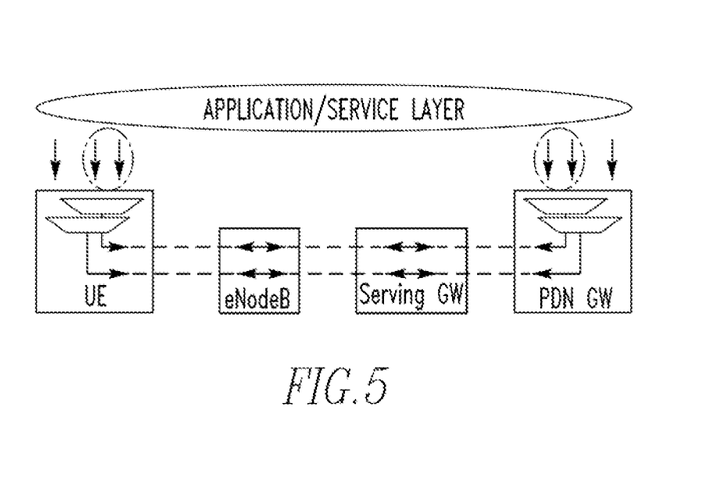
FIG. 5 shows service aware RRM in smart RAN.

FIG. 5 shows how smart RAN 10 can achieve increased QoS granularity by using packet inspection such as SPI (Stateful Packet Inspection), DPI (Deep Packet Inspection) etc. This increased granularity allows RRM (Radio Resource Management) to react faster to different services. The circle in figures shows how further prioritization of contents within the same radio bearer can be performed. Let's assume that the smart RAN 10 knows that the bearer within the circle is interactive signaling (e.g. TCP/HTTP setup) while the bearer outside the circle is file download (e.g. FTP). it can then prioritize the interactive signaling over the file download. Using the same service awareness, the smart RAN 10 can also manage the connection mode (e.g., idle vs. active modes) of the LTE 12.

Figure 6:
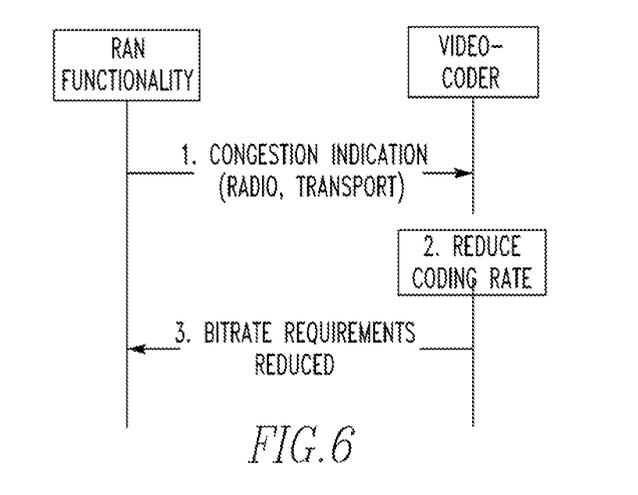
FIG. 6 shows radio and transport network feedback to service layer in smart RAN.

FIG. 6 presents how the awareness of radio and transport load in the service layer can allow the smart RAN 10 to optimize resource usage and reduce the overhead. In this example, the video coder adapts its service rate to radio/transport load based on the internal feedback received from the cloud RAN 10.

Figure 7:
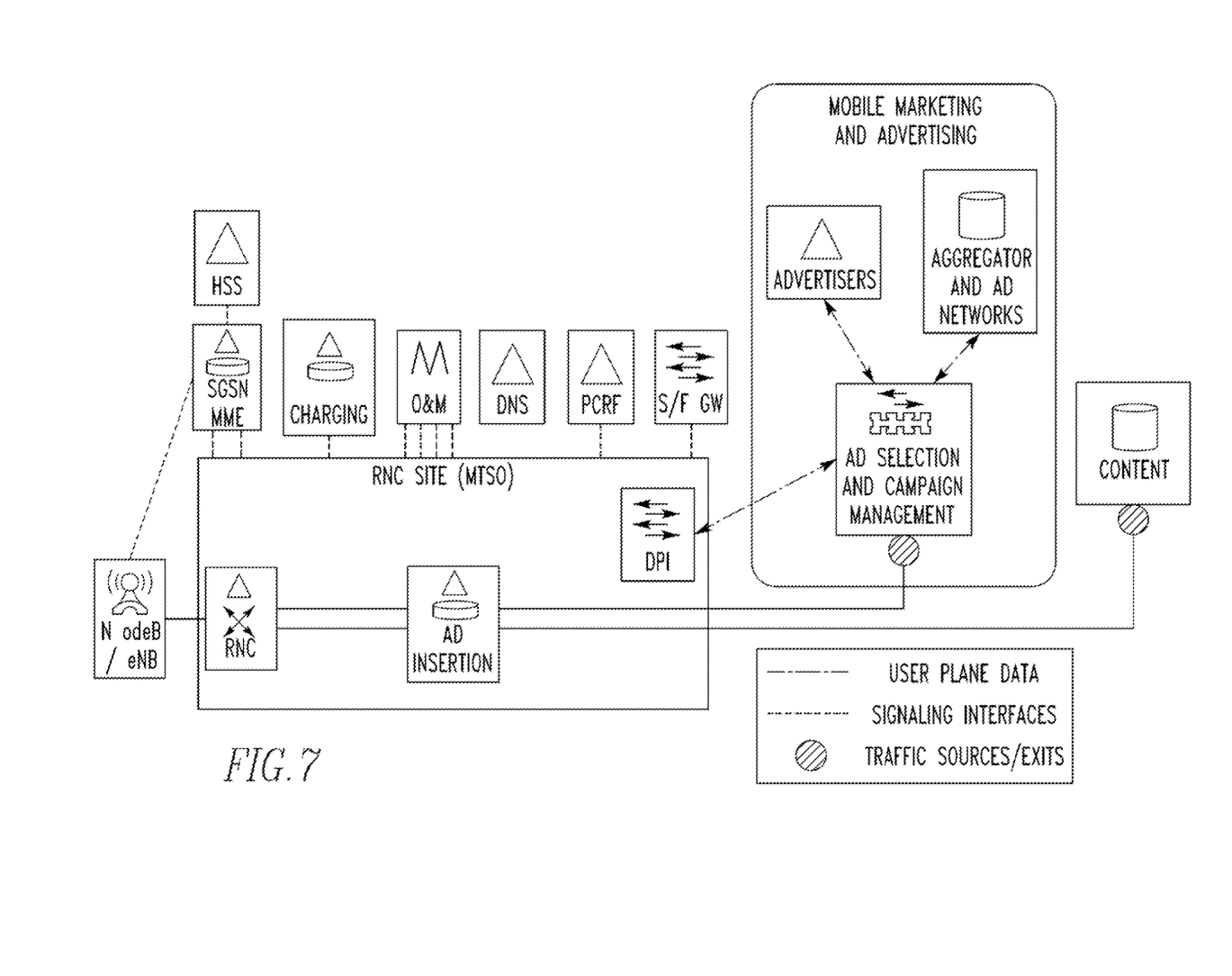
FIG. 7 shows the AD insertion function of the smart RAN.

FIG. 7 provides a sample implementation of the AD Insertion function in the smart RAN 10. As shown in FIG. 7, the AD Insertion function interacts with operator's Mobile Marketing and Advertising components to receive the advertisement impression that needs to be pushed out to the user. The DPI (Deep Packet Inspection) function of the Cloudlet informs the AD Selection and Campaign Management function about specific user behaviors (e.g., demographic information, recent sites visited, most visited site etc.) in order to help operator develop target advertisement for that specific user.

FIG. 8 shows two options for Smart RAN in LTE.
Introduce Packet Inspection (PI), service awareness in eNB.
Introduce some core and service layer functionality in RAN or Evo Smart Controller (ESC). As shown in this Figure, the ESC performs these new functions within its two main components—the Control Plane (Ctrl.) and the User Plane (UP).

Figure 9:
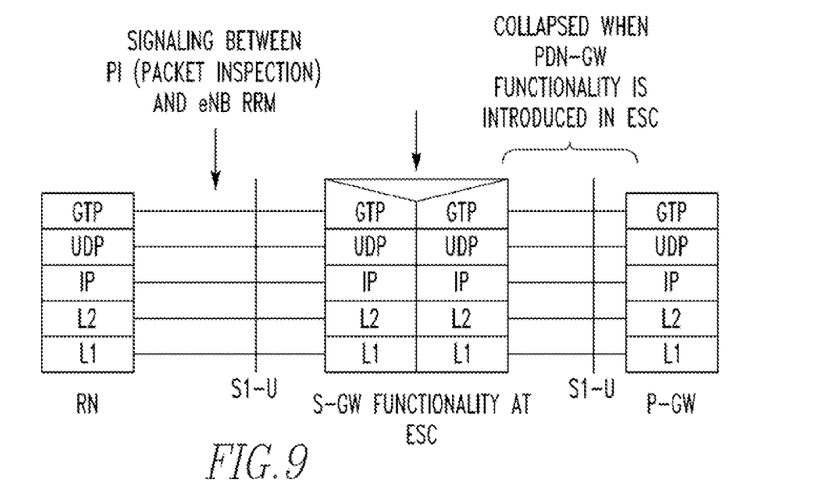
FIG. 9 shows the introduction of LTE user plane functionality in smart RAN.

FIG. 9 shows the introduction of LTE User Plane Functionality in Smart RAN.

Figure 10:
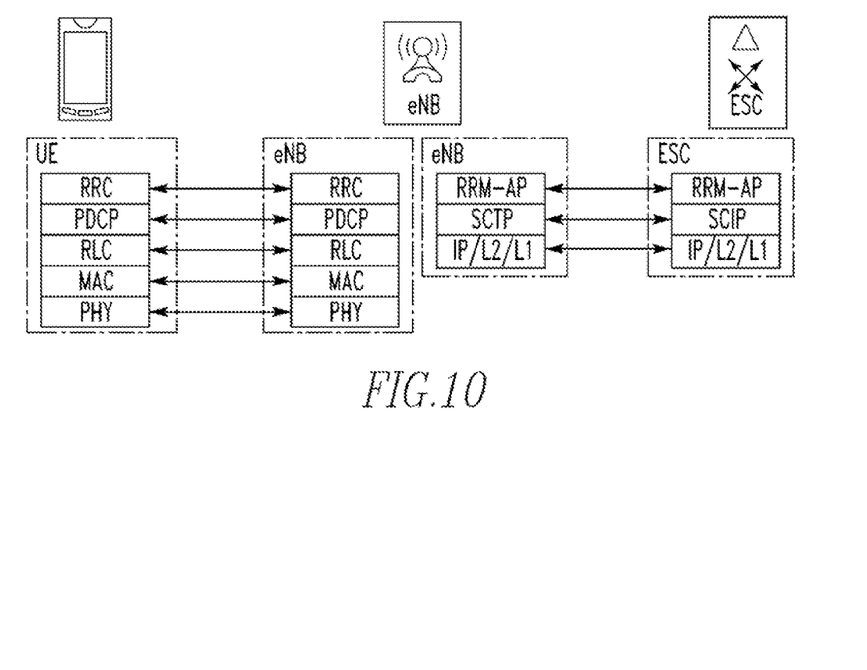
FIG. 10 shows the control plane of LTE in smart RAN.

FIG. 10 shows the control plane of LTE in Smart RAN.
Radio protocols (incl. RRC) still terminate in the eNB
  eNB handles the detailed, time critical radio signaling
  Cell resources are owned by eNB
  RRM-AP (Light weight control protocol between eNB and ESC)
    E.g. an extension of S1-AP/RIM or X2-AP signaling
[EVO Smart Controller for LTE is very different from a WCDMA/3G RNC]

Figure 11:
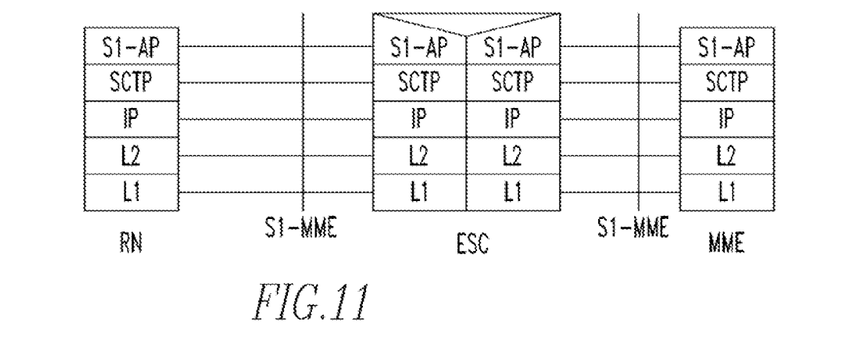
FIG. 11 shows an S1-AP Proxy in smart RAN.

FIG. 11 shows an S1-AP proxy in Smart RAN.
Most of the MME functionality are not so time critical or related to radio resource management
As an alternative to deploying full MME functionality in the ESC, it is possible to use S1-AP proxy mechanism to establish UE contexts (UP/CP).

Figure 12:
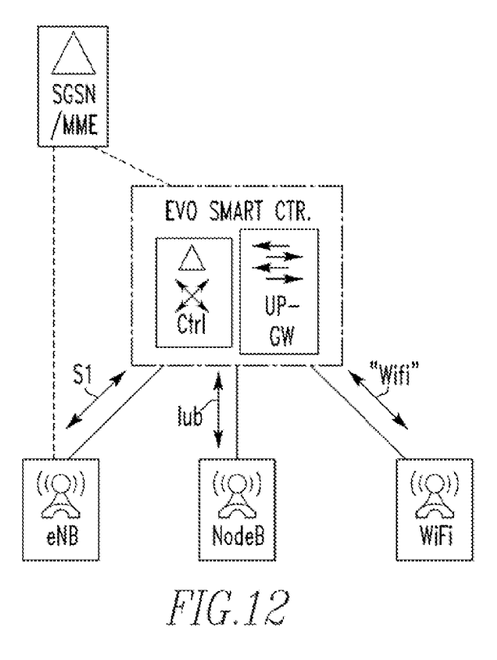
FIG. 12 shows Multi-RAT function of smart RAN.
Figure 13:
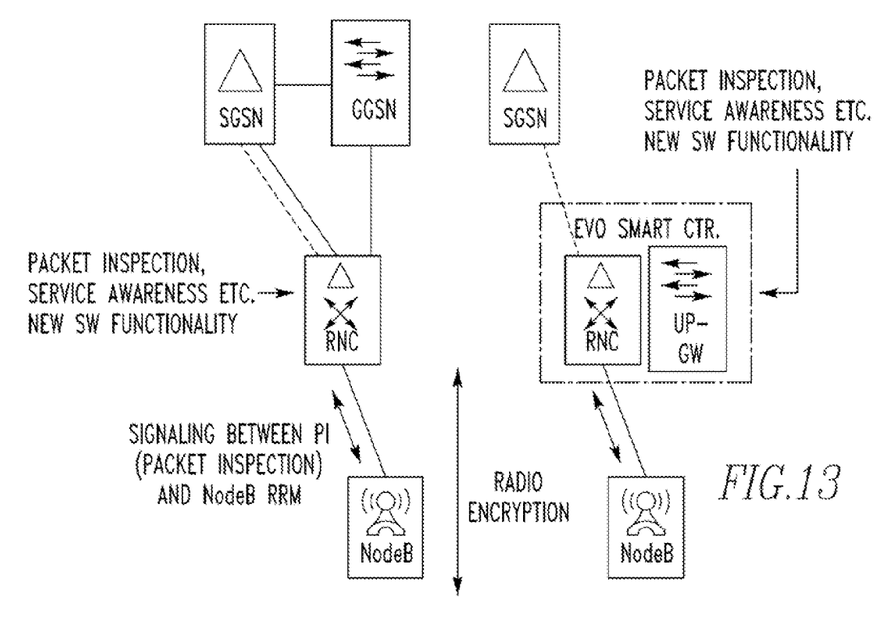
FIG. 13 shows the UTRAN architecture for smart RAN.
Figure 14:
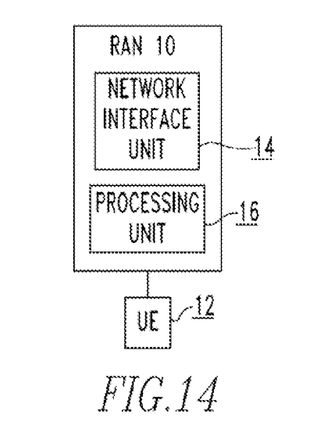
FIG. 14 is a block diagram of a RAN of the present invention.

FIGS. 12 and 13 show the multi-RAT architecture of Smart RAN.

FIG. 12 shows the multi-RAT function of Smart RAN.
The EVO Smart Controller act as a common anchor for service awareness
  Enable for Smart RAN features
  Support core network functionality (e.g. charging, policy control, multi-access anchoring)
  Smart RAN features rely on signaling towards each access
The EVO control act as a common resource handler
  Performing access selection/steering, load balancing between RATs FIG. 13 shows the UTRAN architecture of Smart RAN.
Two options for Smart RAN in UTRAN
  Packet inspection at RAN site below GGSN functionality
  Introducing some core and service layer functionality in RAN (ESC)

The following are the main advantages of this invention.
Improved user experience:
  The smart RAN 10 provides the best possible network connection to the user by making the optimum use of RAN 10/CN resources.
  The smart RAN 10 allows session persistency across multiple access technologies such as Macro, Metrocell, Enterprise Femto, Wifi etc.
  The smart RAN 10 enables access to same services. That is, it allows all services/features across 3GPP and/or non-3GPP access technologies to be available to the end user.
Seamless integration with Macro network:
  The smart RAN 10 provides RRM with Macro network by supporting both efficient Layer management and Soft/softer handoff.
  The smart RAN 10 enables Service transparency.
  The smart RAN 10 supports Session persistency.

ABBREVIATIONS

3/4G 3rd and 4th Generation
HTTP Hyper Text Transfer Protocol
LDAP Lightweight Directory Access Protocol
OTT Over The Top
PCRF Policy and Charging Rules Function
QoS Quality of Service
RAN Radio Access Network
Rn Radio Network
UE User Equipment Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A smart Radio Access Network (RAN) node for wireless distributed cloud computing with a User Equipment (UE), the smart RAN node in communication with at least a Wi-Fi network and an LTE network, the smart RAN node comprising:
  a network interface unit of the smart RAN node that communicates with at least the Wi-Fi and LTE networks; and
  a processing unit of the smart RAN node configured to perform packet inspection on data sent and received as packets between an access point and core network components through the smart RAN node,
  the processing unit being further configured to choose which of the Wi-Fi and LTE networks to use to send and receive the data to and from the access point at a given time based on loading condition of each radio access network technology, user's application/service requirements and user's policy.

2. The smart RAN node of claim 1 wherein the processing unit enforces filtering/quality of service in regard to the packets.

3. The smart RAN node of claim 1 wherein the processing unit performs Serving Gateway (SGW) function, PDN Gateway (PGW) function and Broadband Network Gateway (BNG) function.

4. The smart RAN node of claim 1 wherein the processing unit performs AD (advertisement) insertion, multiservice proxy, firewall and security and Selected IP Traffic Offload/Local IP Access (SIPTO/LIPA) functions.

5. The smart RAN node of claim 4 wherein the processing unit causes the AD Insertion function to interact with an operator's Mobile Marketing and Advertising components to receive an advertisement impression that needs to be sent to the UE.

6. The smart RAN node of claim 5 wherein the processing unit causes the DPI function to inform the AD Selection and Campaign Management function about specific user behaviors in order to assist an operator to develop target advertisements for the UE.

7. The smart RAN node of claim 1 wherein the processing unit performs multiservice proxy to identify services and then map these services down on different QoS bearers based on policies.

8. The smart RAN node of claim 1 wherein the processing unit performs setup or modification of radio bearers as triggered via Policy and Charging Rules Function (PCRF), Web Services AS (Application Server), API Gateway or any other Application Function (AF) servers.

9. The smart RAN node of claim 1 wherein the processing unit establishes QoS granularity by performing packet inspection with either SPI (Stateful Packet Inspection) or DPI (Deep Packet Inspection).

10. The smart RAN node of claim 1 wherein the processing unit provides feedback to a video coder through the network interface for the video coder to adapt the video coder's service rate to radio/transport loading condition at any given instance.

11. The smart RAN node of claim 1, wherein the network interface unit communicates with a 3G network and wherein the processing unit of the RAN node is further configured to control base station nodes in the 3G network.

12. A method for sending and receiving data of a smart Radio Access Network (RAN) node for wireless distributed cloud computing with a User Equipment (UE), the smart RAN node in communication with a Wi-Fi network and an LTE network, the method comprising the steps of:
communicating with at least the Wi-Fi and LTE networks through a network interface unit of the smart RAN node;
performing packet inspection with a processing unit of the smart RAN node on data sent and received as packets between an access point and core network components through the smart RAN node; and
choosing with the processing unit of the smart RAN node which of the Wi-Fi and LTE networks to use to send and receive the data to and from the access point at a given time based on loading condition of each radio access network technology, user's application/service requirements and user's policy.

13. The method of claim 12 further including the step of the processing unit performing packet inspection and enforcing filtering/quality of service in regard to the packets.

14. The method of claim 12 including the step of the processing unit performing Serving Gateway (SGW) function, PDN Gateway (PGW) function and Broadband Network Gateway (BNG) function.

15. The method of claim 12 including the step of the processing unit performing AD (advertisement) insertion, multiservice proxy, firewall and security and Selected IP Traffic Offload/Local IP Access (SIPTO/LIPA).

16. The method of claim 15 including the step of the processing unit causing the AD Insertion function to interact with an operator's Mobile Marketing and Advertising components to receive an advertisement impression that needs to be sent to the UE.

17. The method of claim 16 including the step of the processing unit causing the DPI function to inform the AD Selection and Campaign Management function about specific user behaviors in order to assist an operator to develop target advertisements for the UE.

18. The method of claim 12 including the step of the processing unit performing multiservice proxy to identify services and then map these services down on different QoS bearers based on policies.

19. The method of claim 12 including the step of the processing unit performing setup or modification of radio bearers as triggered via Policy and Charging Rules Function (PCRF), Web Services AS (Application Server), API Gateway or any other Application Function (AF) servers.

20. The method of claim 12 including the step of the processing unit establishing QoS granularity by performing packet inspection with either SPI (Stateful Packet Inspection) or DPI (Deep Packet Inspection).

21. The method of claim 12 including the step of the processing unit providing feedback to a video coder through the network interface for the video coder to adapt the video coder's service rate to accommodate the radio/transport loading condition at any given instance.

* * * * *